(12) United States Patent
Kerr

(10) Patent No.: US 8,673,063 B2
(45) Date of Patent: Mar. 18, 2014

(54) INLET AIR EXTRACTOR FOR A PARTICULATE LOADER AND TRANSFER APPARATUS

(75) Inventor: Paul J. Kerr, Hodgeville (CA)

(73) Assignee: REM Enterprises Inc. (CA)

( * ) Notice: Subject to any disclaimer, the term of this patent is extended or adjusted under 35 U.S.C. 154(b) by 179 days.

(21) Appl. No.: 13/204,220

(22) Filed: Aug. 5, 2011

(65) Prior Publication Data

US 2013/0025453 A1    Jan. 31, 2013

(30) Foreign Application Priority Data

Jul. 26, 2011 (CA) .................................. 2747444

(51) Int. Cl.
*B01D 45/00* (2006.01)

(52) U.S. Cl.
USPC ................... 95/267; 55/315; 55/320; 55/337; 55/428; 55/430; 55/433; 55/439; 55/418; 55/431; 55/432

(58) Field of Classification Search
USPC ........... 55/315–337, 428, 430–433, 439, 418; 95/267; 415/203, 223, 53, 38, 39, 151, 415/152, 168, 28; 209/27, 29, 139.2, 137, 209/148, 250, 281; 406/53, 38, 39, 151, 406/152, 168
See application file for complete search history.

(56) References Cited

U.S. PATENT DOCUMENTS 3,512,340 A * 5/1970 Fischer et al. .................... 95/60
6,110,242 A * 8/2000 Young ............................. 55/337

* cited by examiner

*Primary Examiner* — Dung H Bui
(74) *Attorney, Agent, or Firm* — Thompson Hine L.L.P.

(57) ABSTRACT

A particulate loader separation device including a particulate and air inlet for receiving a flow of air and particulate. A separation chamber for separating the air and the particulate is connected to the particulate and air inlet. An air outlet is connected to a suction mechanism for providing suction to the separation chamber. A particulate outlet is connected to a particulate conveyor for conveying the particulate from the separation chamber. An inlet air extractor is connected to the particulate and air inlet and is connected to one of the suction mechanism and a second suction mechanism. The inlet air extractor is connected to the particulate and air inlet at a predetermined location thereof such that in operation a portion of the air of the flow of air and particulate is extracted prior entering the separation chamber.

14 Claims, 23 Drawing Sheets

INLET AIR EXTRACTOR FOR A PARTICULATE LOADER AND TRANSFER APPARATUS

This application claims priority to Canadian Patent Application No. 2,747,444 entitled INLET AIR EXTRACTOR FOR A PARTICULATE LOADER AND TRANSFER APPARATUS by inventor Paul Kerr, in the name of REM Enterprises Inc., filed on Jul. 26, 2011, the entire contents of which are hereby incorporated by reference.

FIELD

The present invention relates to a high capacity particulate loader and transfer apparatus for grains, fertilizers, chemicals, particulates and granular material (hereinafter referred to as "particulates"), and more particularly, relates to an inlet air extractor for a particulate loader and transfer apparatus.

BACKGROUND

Particulate loader and transfer devices are known, and as described in U.S. Pat. No. 7,431,537, are used by farmers and others to load and transfer grain and other particulates in a convenient manner. These devices include, for example, one or more blowers to create suction within an air-materials separation chamber and a vacuum pickup hose attached thereto, to transport grain or other materials from one location, into the air-materials separation chamber in the bottom of which is positioned a conveying mechanism such as, for example, an auger for transferring the grain or other particulate material from the air-materials separation chamber into, for example an open truck, container or other location.

State of the art particulate loaders have a separating drum of a generally perforated nature disposed within the air-materials separating chamber for separating the particulate from the air.

Typically, the drum is affixed to a fore-and-aft extending shaft about whose axis the drum is rotated during operation. Air drawn through the air-materials separating chamber passes through the separating drum through small perforations therein, the separating drum's small perforations thereby separating the particulates from the air, leaving the particulate in the air-materials separating chamber while the air which has passed through the perforations in the separating drum is exhausted through the suction mechanism of the particulate loader.

Unfortunately, a large flow of air is required for properly transferring the particulate therewith resulting in a large volume of air drawn into the separation chamber and to be handled therein. As a consequence the separation chamber has to be of a large size that is sufficient for handling the large volume of air and, furthermore, the handling of the large volume of air substantially reduces the efficiency of the separation process.

It is desirable to provide an inlet air extractor for reducing the air drawn into the separation chamber of a particulate loader and transfer apparatus.

It is also desirable to provide an inlet air extractor for a particulate loader and transfer apparatus that is simple and reliable.

It is also desirable to provide an inlet air extractor for a particulate loader and transfer apparatus that is implementable in existing designs of particulate loader and transfer apparatuses.

SUMMARY

Accordingly, one object of the present invention is to provide an inlet air extractor for reducing the air drawn into the separation chamber of a particulate loader and transfer apparatus.

Another object of the present invention is to provide an inlet air extractor for a particulate loader and transfer apparatus that is simple and reliable.

Another object of the present invention is to provide an inlet air extractor for a particulate loader and transfer apparatus that is implementable in existing designs of particulate loader and transfer apparatuses.

According to one aspect of the present invention, there is provided a particulate loader separation device. The particulate loader separation device comprises a particulate and air inlet for receiving a flow of air and particulate. A separation chamber for separating the air and the particulate is connected to the particulate and air inlet. An air outlet is connected to a suction mechanism for providing suction to the separation chamber. A particulate outlet is connected to a particulate conveyor for conveying the particulate from the separation chamber. An inlet air extractor is connected to the particulate and air inlet and is connected to one of the suction mechanism and a second suction mechanism. The inlet air extractor is connected to the particulate and air inlet at a predetermined location thereof such that in operation a portion of the air of the flow of air and particulate is extracted prior entering the separation chamber.

According to one aspect of the present invention, there is provided a method for extracting air from a flow of air and particulate. A particulate loader comprising: a separation chamber; a particulate and air inlet connected to the separation chamber for providing the flow of air and particulate to the separation chamber; a suction mechanism connected to the separation chamber for providing suction to the separation chamber; and, a particulate conveyor connected to the separation chamber for conveying the particulate from the separation chamber, is provided. An inlet air extractor is connected to the particulate and air inlet. During operation of the particulate loader suction is provided to the inlet air extractor for extracting a portion of the air of the flow of air and particulate prior entering the separation chamber.

One advantage of the present invention is that it provides an inlet air extractor for reducing the air drawn into the separation chamber of a particulate loader and transfer apparatus.

A further advantage of the present invention is that it provides an inlet air extractor for a particulate loader and transfer apparatus that is simple and reliable.

A further advantage of the present invention is that it provides an inlet air extractor for a particulate loader and transfer apparatus that is implementable in existing designs of particulate loader and transfer apparatuses.

BRIEF DESCRIPTION OF THE DRAWINGS

An embodiment of the present invention is described below with reference to the accompanying drawings, in which.

DETAILED DESCRIPTION

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, certain methods and materials are now described.

Figure 1A:
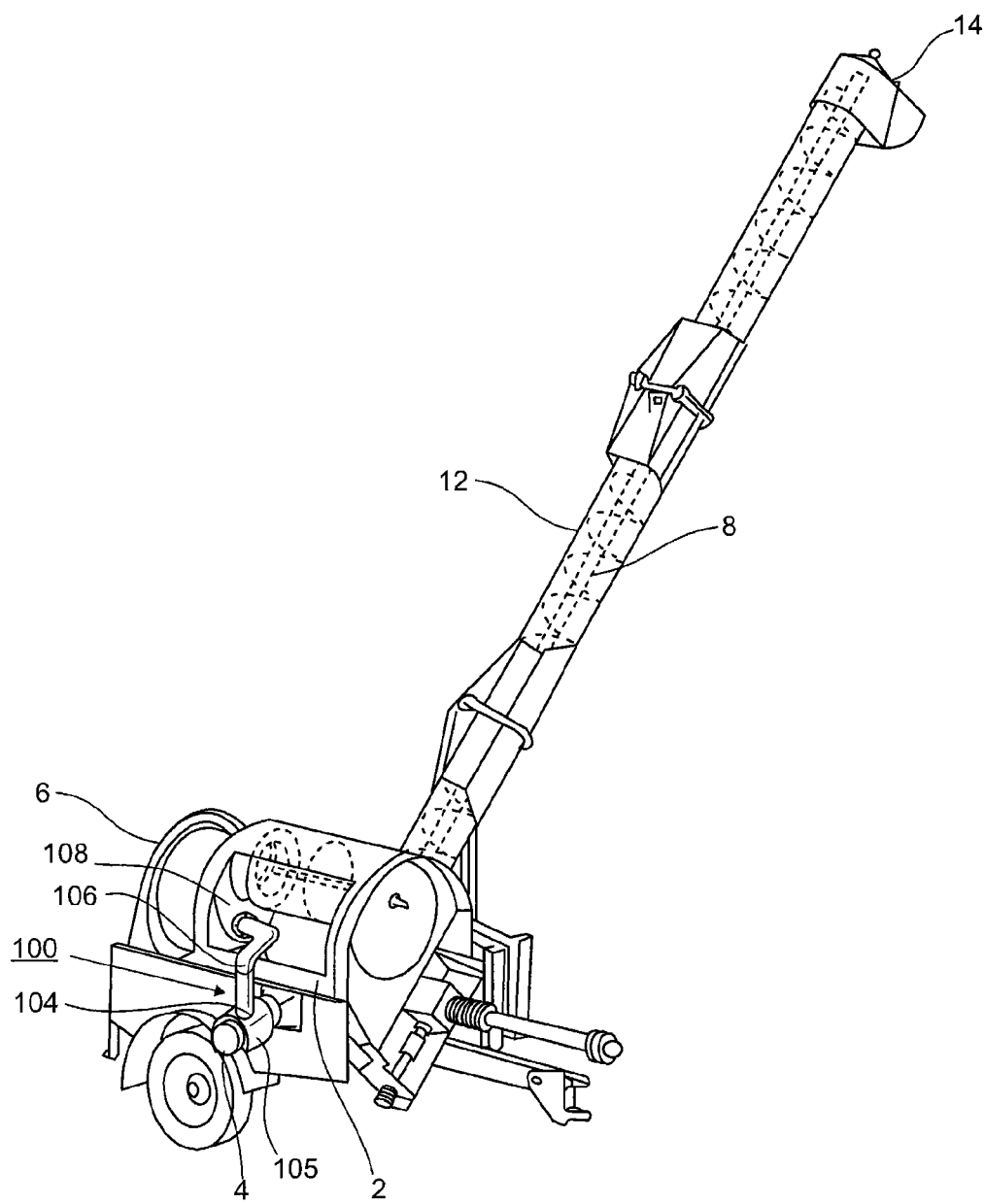
FIGS. 1a and 1b are simplified block diagrams illustrating a front perspective view and a rear perspective view, respectively, of a particulate loader and transfer apparatus having an inlet air extractor according to an embodiment of the invention.
Figure 1B:
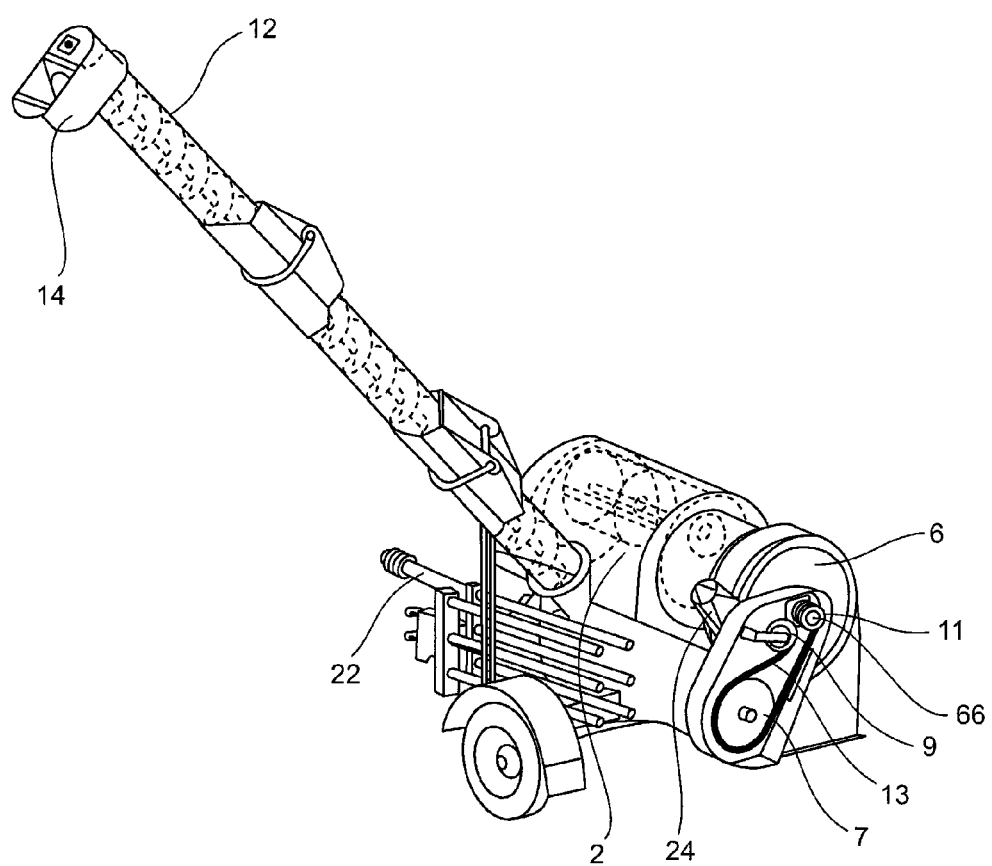

While the description of an embodiments herein below is with reference to a particulate loader and transfer apparatus as illustrated in FIGS. 1a and 1b, it will become evident to those skilled in the art that the embodiments of the invention are not limited thereto, but are also applicable for other types of particulate loader and transfer apparatuses using, for example, different embodiments of separation chambers, suction mechanisms, particulate conveying mechanisms, and drive mechanisms.

In the particulate loader and transfer apparatus illustrated in FIGS. 1a and 1b, an air-material separating chamber 2 is generally provided, having an inlet 4 which is adapted to connect to a vacuum pickup hose (not shown), relatively low pressure being created within the air-material separating chamber 2 and the vacuum pickup hose by way of one or more air vacuum pumps 6 in communication with the air-material separating chamber 2, the particulate material being drawn through the vacuum pickup hose and inlet 4 and into the air-material separating chamber 2 as a result of the relatively low pressure within the air-material separating chamber 2, the particulate material thereafter separating itself from the airflow within the air-material separating chamber 2 (the air-material separation in one case being aided by a separating drum 10 within the air-material separating chamber 2 through which separating drum 10 only air, dust and small particles may pass) the particulate material falling onto an auger 8 which extends generally upwardly and outwardly from the air-material separating chamber 2 and which auger 8 transports the particulate material from the bottom of the air-material separating chamber 2, within a tubular housing 12 enclosing the auger tube 8, through an end-dump housing 14 to a waiting truck, container or other particulate storage area. As illustrated in FIG. 1B, the air vacuum pump 6 is, for example, driven by way of a series of pulleys 7, 9 and 11 and a belt arrangement 13 (possibly driven by a power takeoff (not shown) by way of a drive shaft 22 in a conventional manner), a pulley 11 being secured to the air vacuum pump shaft 66 in a conventional manner to drive the air vacuum pump shaft 66 and air vacuum pump 6. The air drawn from the air-material separating chamber 2 by the centrifugal air vacuum pump 6 is exhausted to atmosphere by way of an exhaust outlet 24.

Referring to FIG. 1a, an inlet air extractor 100 according to an embodiment of the invention is provided. The inlet air extractor 100 comprises an extractor conduit 106 connected at a first end 104 to the particulate and air inlet 4. A second opposite end of the extractor conduit 106 is connected at extractor connection 108 to the suction mechanism 6 such that suction is provided thereto. As illustrated in FIG. 1a, the extractor connection 108 is disposed in the suction side of the suction mechanism 6 with the extractor conduit 106 penetrating a side wall of the separation chamber 2 and being partially disposed therein, but is not limited thereto. For example, the extractor connection 108 is disposed in a fluid conduit connecting the suction mechanism 6 to the separation chamber 2. In operation a portion of the air of the flow of air and particulate is extracted prior to entering the separation chamber 2 and is directly transferred to the suction mechanism 6, thus reducing the amount of air drawn into the separation chamber 2.

Figure 2A:
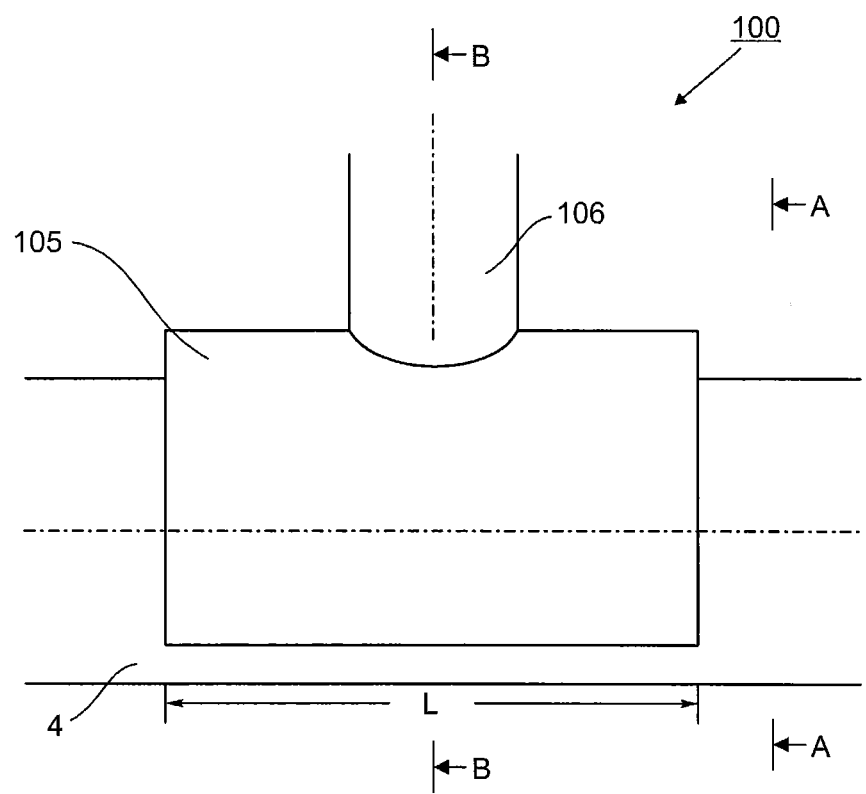
FIGS. 2a to 2g are simplified block diagrams illustrating a side view and cross-sectional views of the inlet air extractor according to an embodiment of the invention.
Figure 2B:
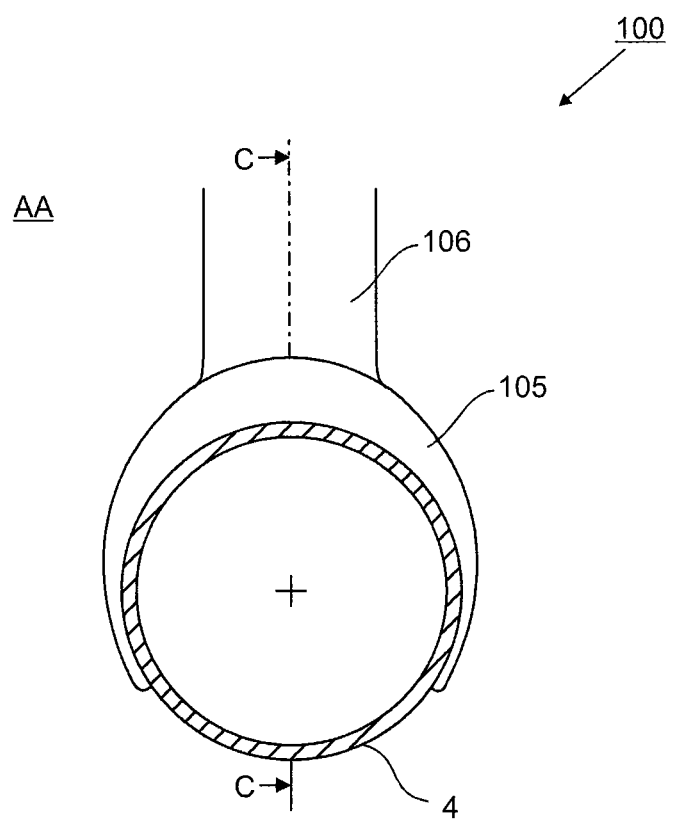
Figure 2C:
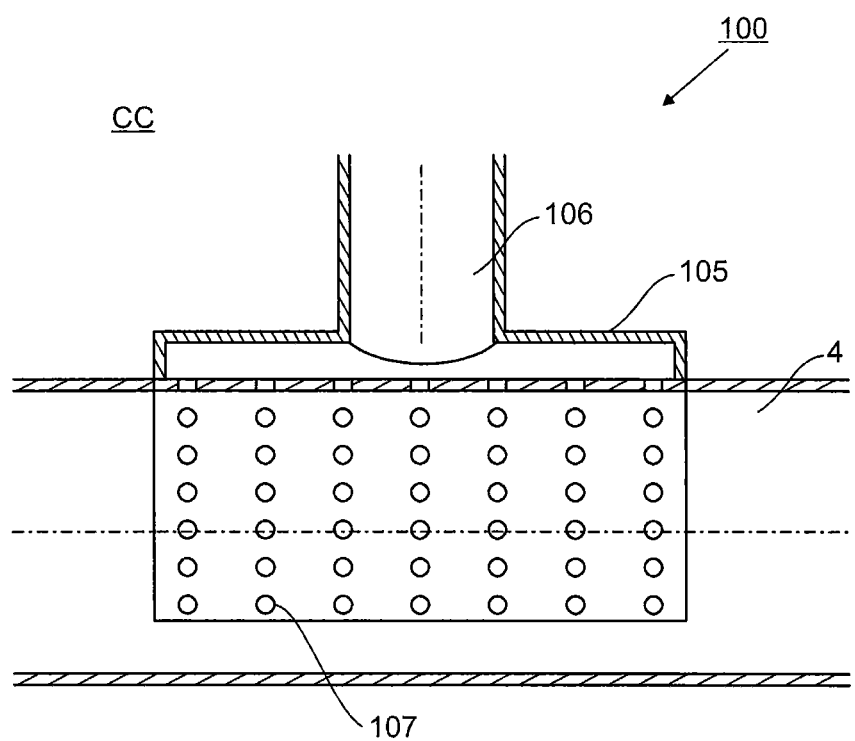
Figure 2D:
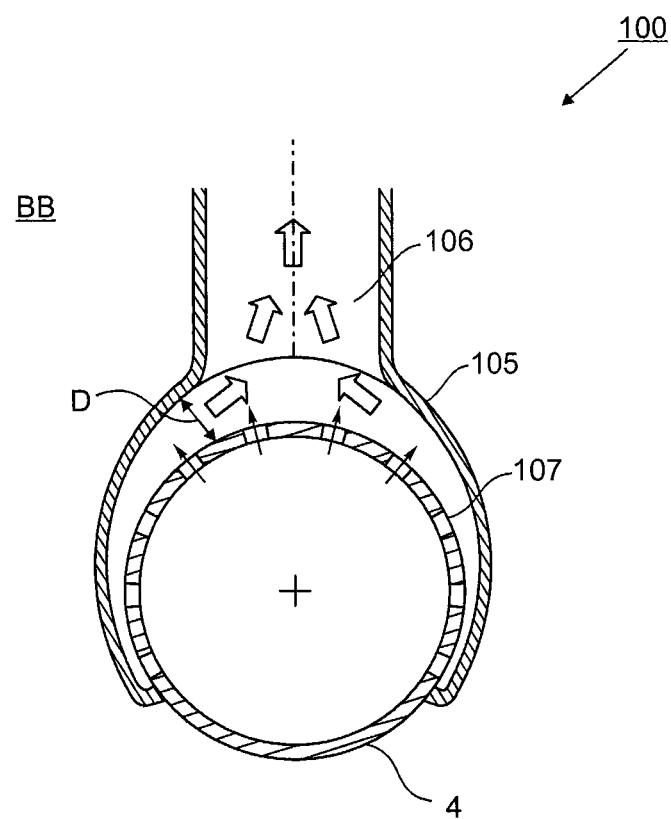

The extractor conduit 106 can be connected to the particulate and air inlet 4 via a shroud 105 surrounding an upper portion of the particulate and air inlet 4, as illustrated in FIGS. 2a to 2g. The upper portion of the air inlet 4 surrounded by the shroud 105 has an opening therein or has a plurality of perforations 107 disposed therein or, alternatively, a screen is employed, as illustrated in FIGS. 2c and 2d. The perforations are of, for example, circular shape and have a predetermined size such that transmission of the particulate and other particles immersed in the flow of particulate and air is substantially prevented while extraction of a portion of the air there through is enabled, as indicated by the arrows in FIG. 2d. The extracted air is then guided through the shroud 105 to the extractor conduit 106. In typical agricultural applications—for example, for transferring grains and fertilizer—a substantial portion of the particulate are transferred through the lower portion of the hose and the particulate and air inlet 4, thus, enabling provision of the perforations 107 in the upper approximately ⅔ of the circumference of the particulate and air inlet 4. The length of the perforated section 107 and, therefore, the length L of the shroud 105 covering the same are determined such that a predetermined amount of air is extracted there through. For example, providing a larger length of the perforated section 107 enables reducing the amount of air extracted through each perforation, thus reducing the likelihood that particles immersed in the flow of particulate and air are transmitted there through. The side walls of the shroud 105 can be gently curved with the distance D between the perforated section 107 of the particulate and air inlet 4 and the inside wall of the shroud 105 increasing towards the top, as illustrated in FIG. 2d, in order to accommodate the increasing flow of extracted air towards the top of the shroud 105 and to provide a more equally distributed extraction of air between the top and bottom of the perforated section 107. Alternatively, the distance D is kept constant or varied in a different fashion. Further alternatively, the shroud comprises straight walls forming, for example, a box-like structure. Typically, the tubing of the extractor conduit 106 is smaller in diameter than the tubing of the particulate and air inlet 4, since only a portion of the air of the flow of particulate and air is extracted by the inlet air extractor 100. The perforated section 107, the shroud 105 and extractor conduit 106 can be made using conventional materials—such as, for example, steel/aluminum tubing and steel/aluminum sheet material—and conventional manufacturing technologies such as welding and laser cutting.

Figure 2E:
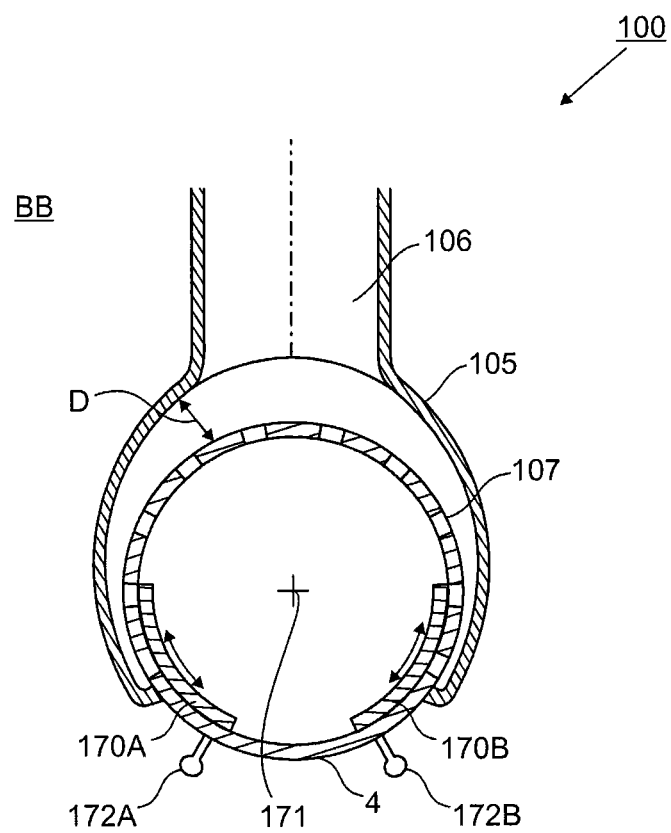

Optionally, the size of the perforated section 107 is variable, for example, by variably covering a lower portion of the perforated section 107 to accommodate different particulate, as illustrated in FIG. 2e. Curved covers 170A and 170B are rotatably movable around center 171 of the particulate and air inlet 4—indicated by arrows—with, for example, the covers being shaped to glide along the inside wall of the perforated section 107 in a guided fashion. The covers 170A and 170B are moved, for example, manually using handles 172A and 172B or are machine operated using a step motor.

Figure 2F:
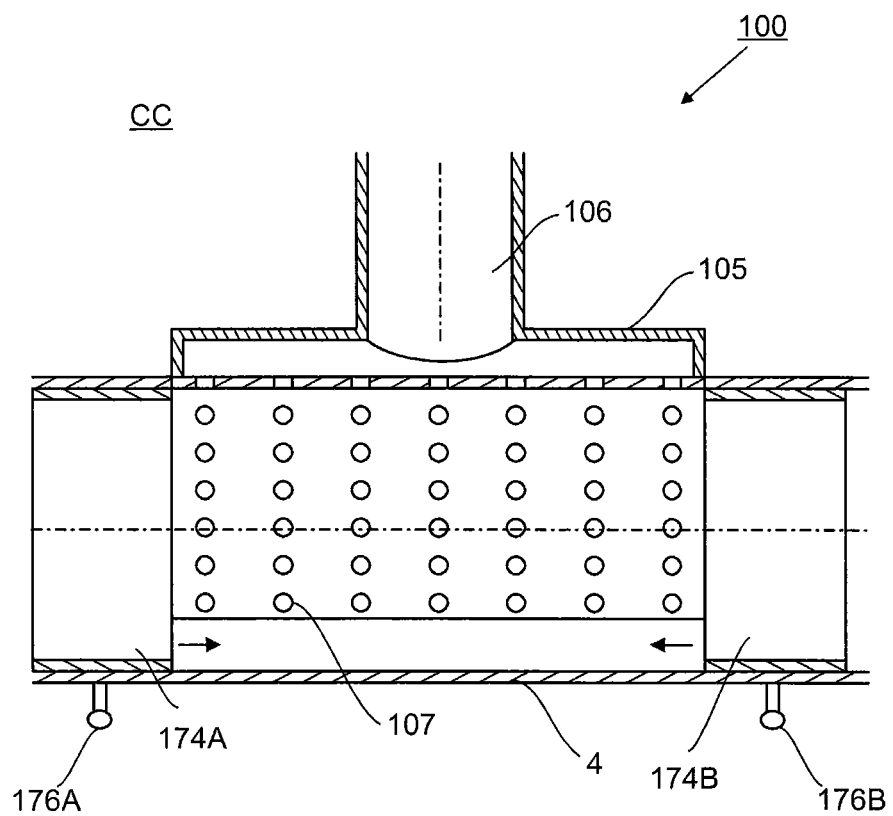
Figure 2G:
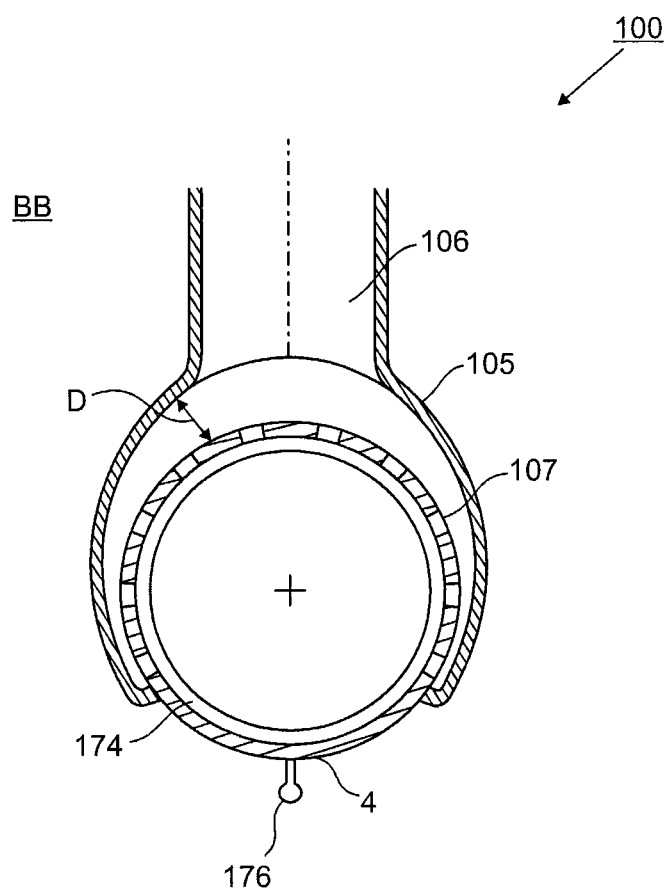

Further optionally, the size of the perforated section 107 is variable, for example, by variably covering a left hand side and a right hand side portion of the perforated section 107 to adjust the amount of air extracted there through, as illustrated in FIGS. 2f and 2g. Collars 174A and 174B are longitudinally movable along the particulate and air inlet 4—indicated by arrows—with, for example, the collars being shaped to glide along the inside wall of the particulate and air inlet 4 and the perforated section 107 in a guided fashion. The collars 174A and 174B are moved, for example, manually using handles 176A and 176B or are machine operated using a step motor.

The extraction of air—and in particular the shape of the covers 170A, 170B and collars 174A, 174B—may be realized such that the introduction of disturbances in the flow of particulate and air there through and suction loss associated therewith is substantially prevented.

Optionally, a screen or baffles are disposed in the extractor conduit 106 to prevent particles immersed in the flow of extracted air from being transmitted to the suction mechanism 6.

Figure 3A:
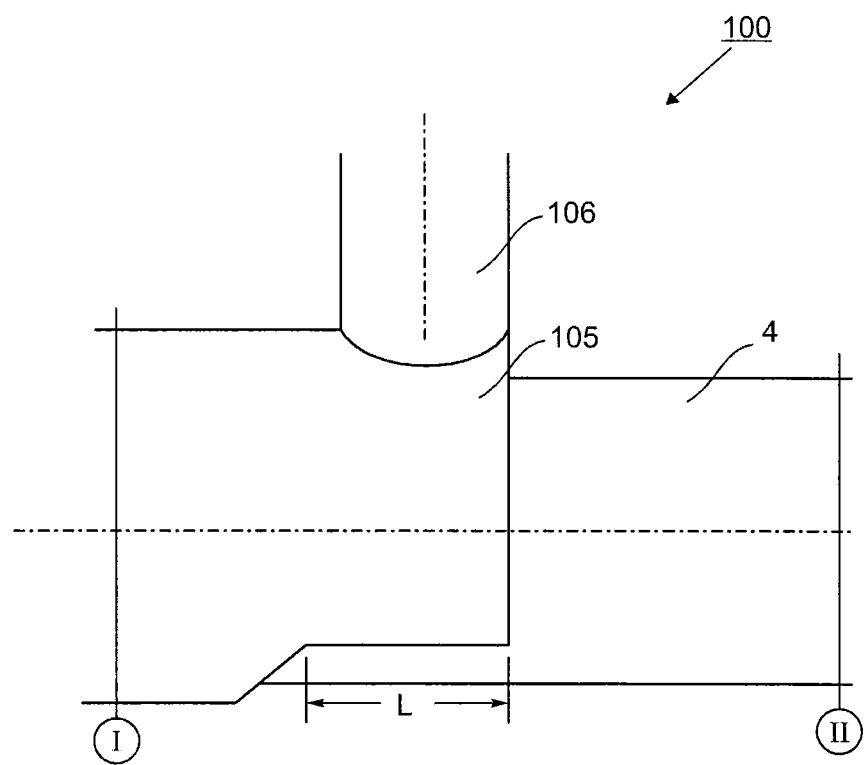
FIGS. 3a to 3c are simplified block diagrams illustrating a side view and cross-sectional views of the inlet air extractor according to another embodiment of the invention.
Figure 3B:
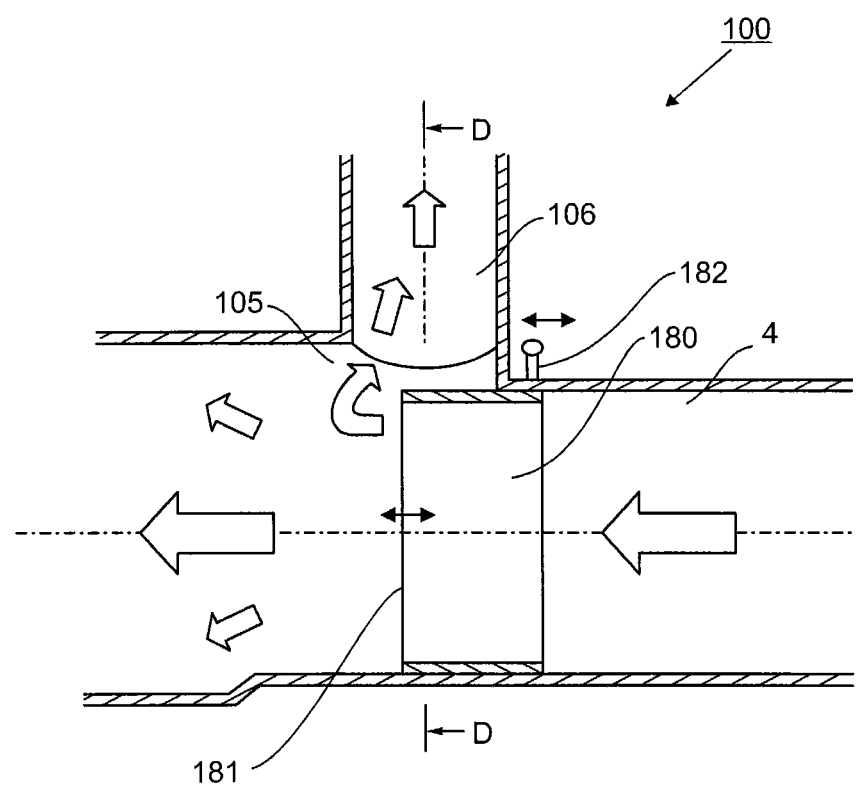
Figure 3C:
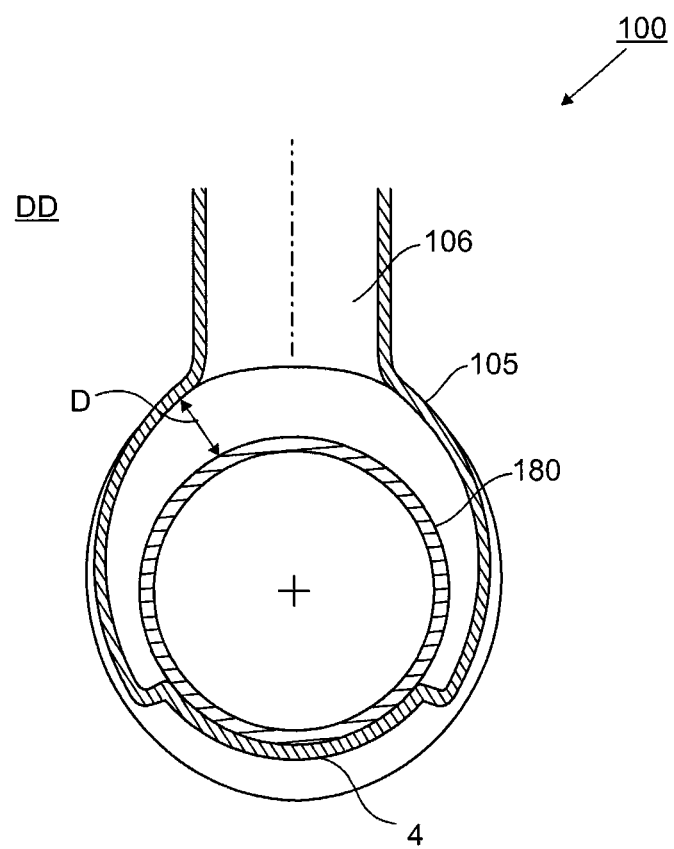

Referring to FIGS. 3a to 3c, an inlet air extractor 100 according to another embodiment of the invention is provided. Here, the shroud 105 of the extractor is incorporated into a transition of the cross section of the particulate and air inlet 4 from a smaller cross section at II to a larger cross section at I with the larger cross section I being connected to the air-material separating chamber 2. In one case, the shroud 105 covers the upper ⅔ of the circumference of the particulate and air inlet 4, as illustrated in FIG. 3c, but is not limited thereto. The length L of the shroud 105 is, for example, approximately equal to the diameter of the extractor conduit 106 before transforming into the cross section I. Collar 180 is longitudinally movable along the particulate and air inlet 4—indicated by arrows—with, for example, the collar being shaped to glide along the inside wall of the particulate and air inlet 4 in a guided fashion. The collar 180 is moved, for example, manually using handle 182 or is machine operated using a step motor. Alternatively, the collar 180 is fixed in position or replaced by an extension of the particulate and air inlet tubing 4 into the shroud 105. In one case, the distance D between the collar 180 and the inside wall of the shroud 105 increases towards the top, as illustrated in FIG. 3c, but is not limited thereto.

Typically, the tubing of the extractor conduit 106 is smaller in diameter than the tubing of the particulate and air inlet 4, since only a portion—indicated by the small block arrows—of the air of the flow of particulate and air—indicated by the large block arrows—is extracted by the inlet air extractor 100. The collar 180 is placed such that the suction provided via the shroud 105 extracts a portion of the air of the flow of particulate and air but substantially prevents the particulate and other particles immersed in the flow of particulate and air from being transmitted there through to the suction mechanism 6, potentially damaging the same. This is accomplished by guiding the flow of air and particulate through the collar 180 and by substantially changing the direction of the flow of extracted air around the left hand side edge 181 of the collar 180, as indicated by the curved arrow in FIG. 3b.

The extraction of air—and in particular the shape of the collar 180—may be realized such that the introduction of disturbances in the flow of particulate and air there through and suction loss associated therewith is substantially prevented.

Optionally, a screen or baffles are disposed in the extractor conduit 106 to prevent particles immersed in the flow of extracted air from being transmitted to the suction mechanism 6.

Figure 4A:
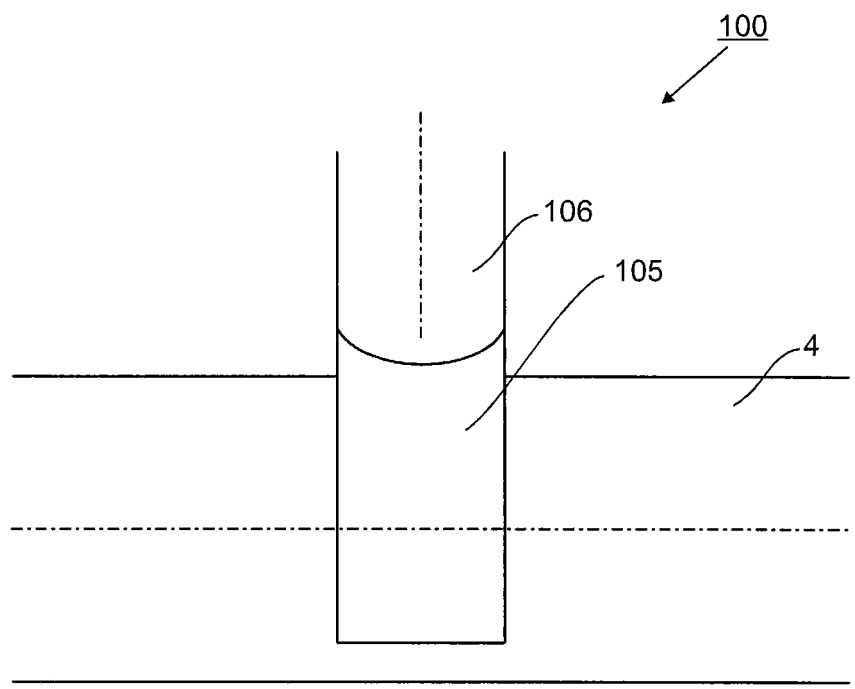
FIGS. 4a to 4c are simplified block diagrams illustrating a side view and cross-sectional views of the inlet air extractor according to another embodiment of the invention.
Figure 4B:
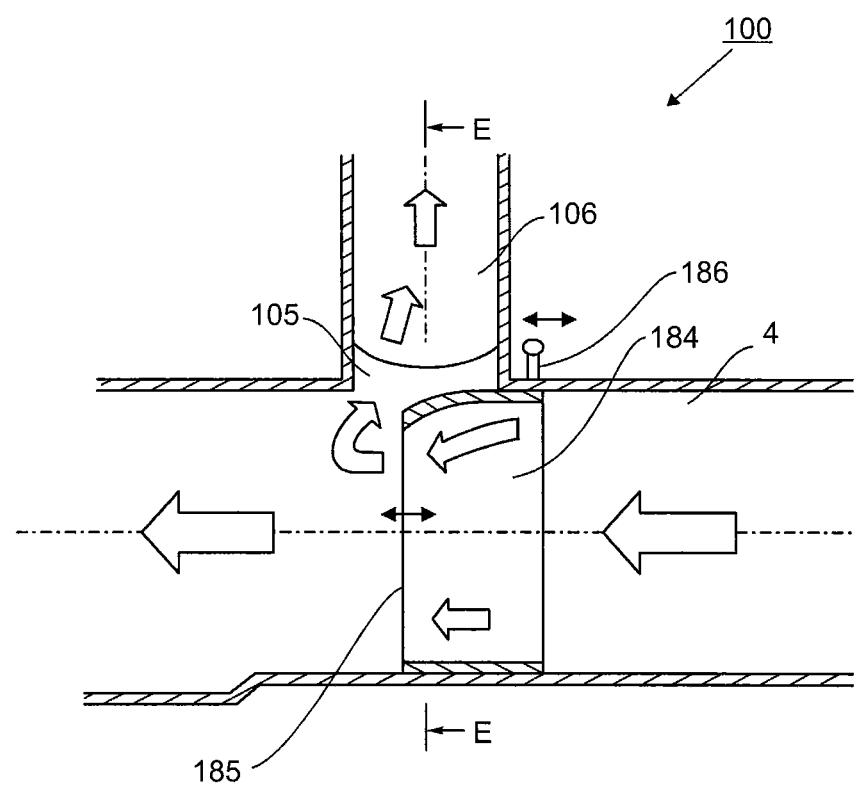
Figure 4C:
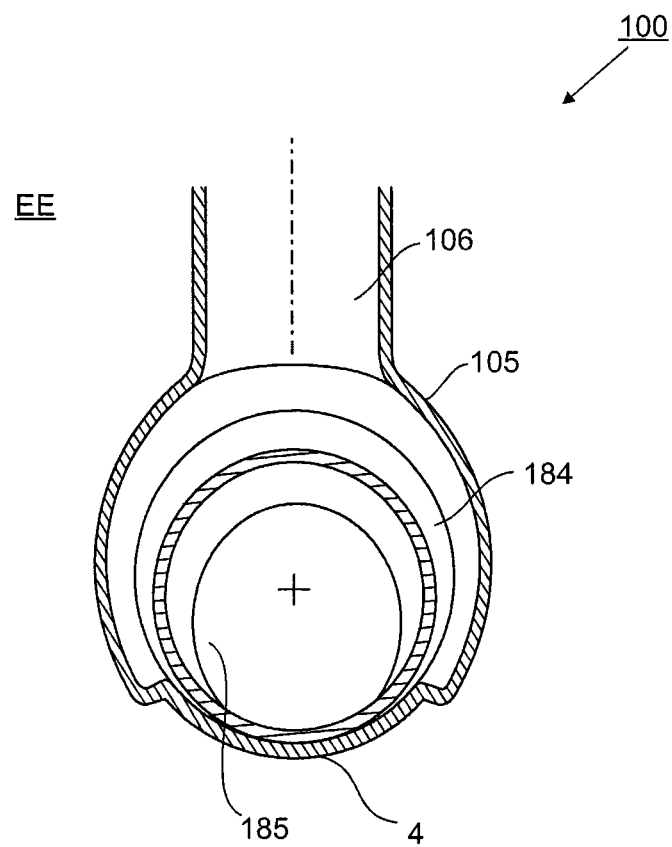

Referring to FIGS. 4a to 4c, an inlet air extractor 100 according to another embodiment of the invention is provided. Here the particulate and air inlet 4 has a constant cross section. The shroud 105 can cover the upper ⅔ of the circumference of the particulate and air inlet 4, as illustrated in FIG. 4c, but is not limited thereto. The length L of the shroud 105 is, for example, approximately equal to the diameter of the extractor conduit 106. Deflecting collar 184 is longitudinally movable along the particulate and air inlet 4—indicated by arrows—with, for example, the deflecting collar 184 being shaped to glide along the inside wall of the particulate and air inlet 4 in a guided fashion with a right hand side portion thereof and being gently curved towards the left hand side, as illustrated in FIGS. 4b and 4c. The deflecting collar 184 is moved, for example, manually using handle 186 or is machine operated using a step motor. Alternatively, the deflecting collar 184 is fixed in position. In one case, the distance D between the deflecting collar 184 and the inside wall of the shroud 105 increases towards the top, as illustrated in FIG. 4c, but is not limited thereto.

Typically, the tubing of the extractor conduit 106 is smaller in diameter than the tubing of the particulate and air inlet 4, since only a portion—indicated by the small block arrows—of the air of the flow of particulate and air—indicated by the large block arrows—is extracted by the inlet air extractor 100. The deflecting collar 184 is placed such that the suction provided via the shroud 105 extracts a portion of the air of the flow of particulate and air but substantially prevents the particulate and other particles immersed in the flow of particulate and air from being transmitted there through to the suction mechanism 6 potentially damaging the same. This is accomplished by guiding the flow of air and particulate through the deflecting collar 184 generally towards the center of the particulate and air inlet 4, indicated by the curved arrow inside the deflecting collar 184, and by substantially changing the direction of the flow of extracted air around the left hand side edge 185 of the deflecting collar 184, as indicated by the curved arrow in FIG. 4b.

The extraction of air—and in particular the shape of the deflecting collar 184—may be realized such that the introduction of disturbances in the flow of particulate and air there through and suction loss associated therewith is substantially prevented.

Optionally, a screen or baffles are disposed in the extractor conduit 106 to prevent particles immersed in the flow of extracted air from being transmitted to the suction mechanism 6.

Figure 5A:
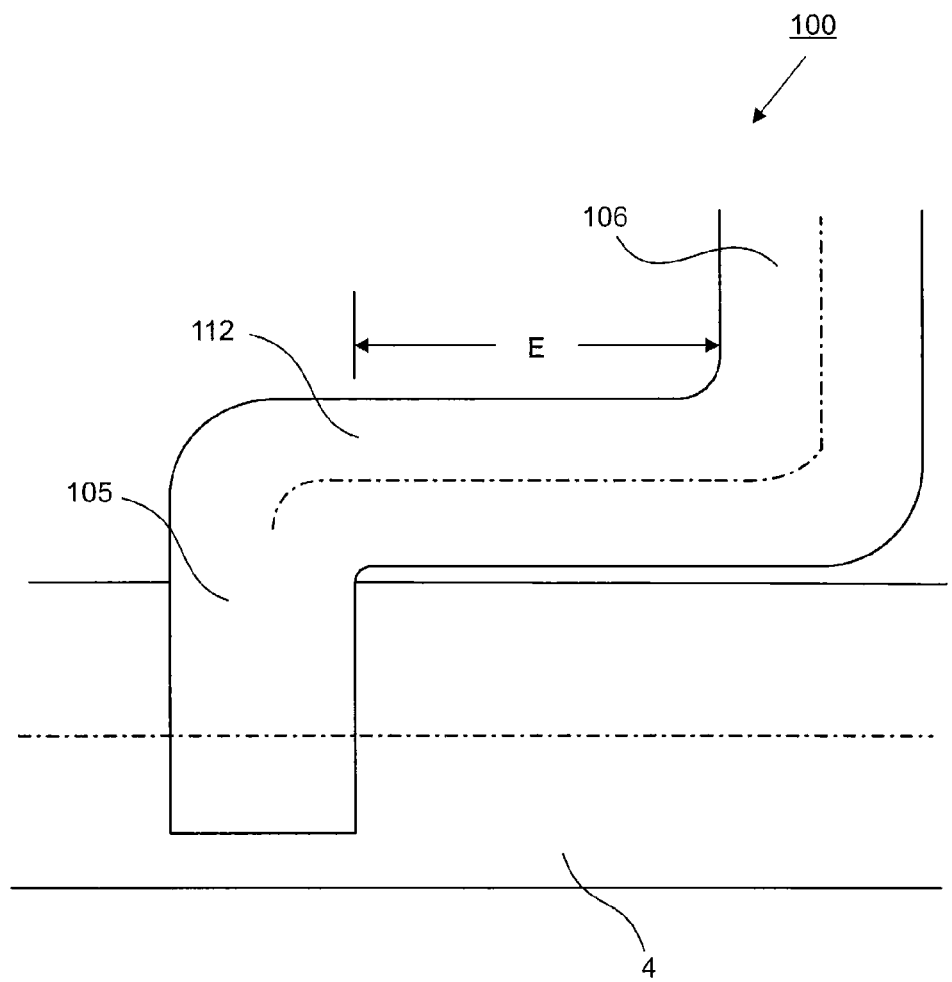
FIGS. 5a to 5c are simplified block diagrams illustrating a side view and cross-sectional views of the inlet air extractor according to another embodiment of the invention.
Figure 5B:
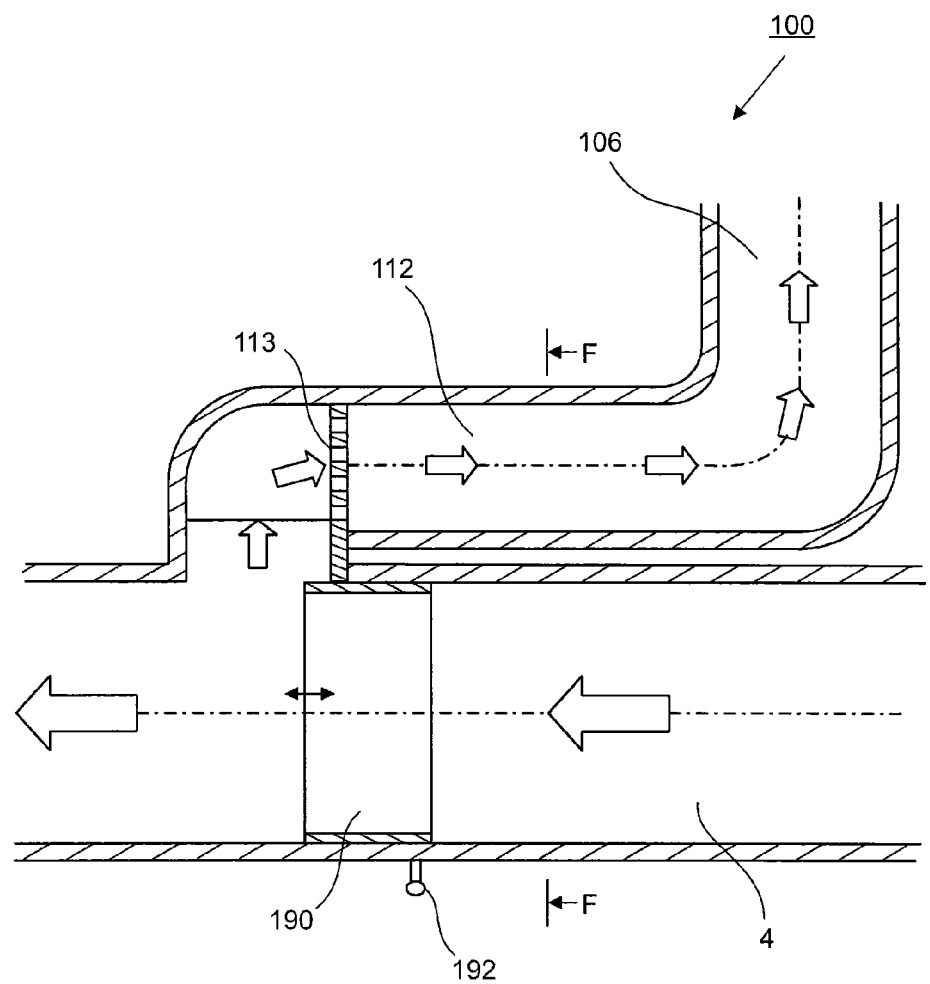
Figure 5C:
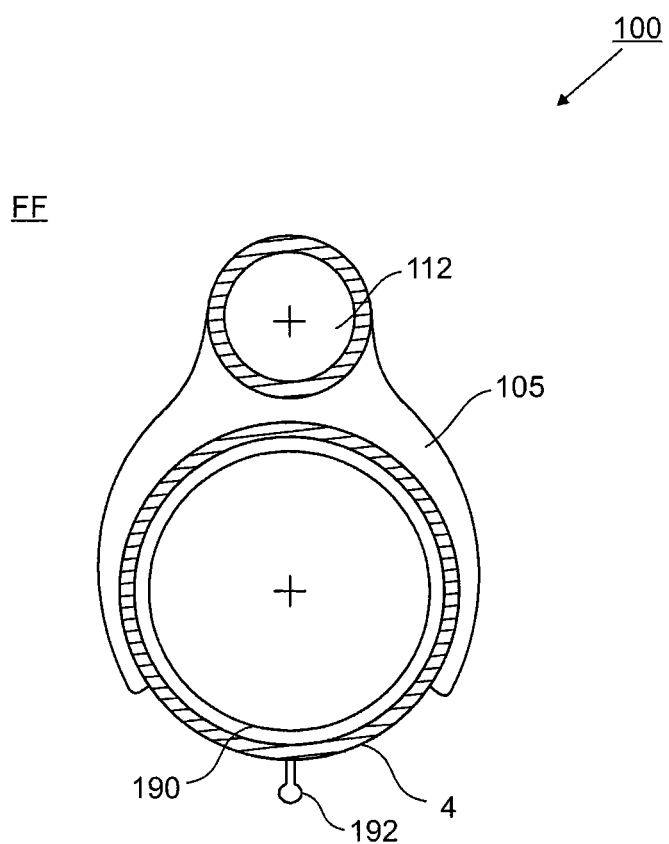

Referring to FIGS. 5a to 5c, an inlet air extractor 100 according to another embodiment of the invention is provided. The shroud 105 may cover the upper ⅔ of the circumference of the particulate and air inlet 4, as illustrated in FIG. 5c, but is not limited thereto. The length L of the shroud 105 is, for example, approximately equal to the diameter of the extractor conduit 106. The extractor conduit 106 is shaped such that the airflow through a portion 112 of the extractor conduit 106 is oriented opposite and substantially parallel—or at an acute angle—to the flow of air and particulate along a predetermined distance E. The orientation of the extractor conduit 106 causes the flow of extracted air to make a sudden change of direction—as indicated by the small block arrows—and particles immersed in the air flow impinge onto the upper portion of the inside wall of the extractor conduit 106 and fall back due to gravitational action. Optionally, a screen 113 is placed at the intersection of the portion 112 of the extractor conduit 106 with the shroud 105, as illustrated in FIG. 5b. Collar 190 is longitudinally movable along the particulate and air inlet 4—indicated by arrows—with, for example, the collar being shaped to glide along the inside wall of the particulate and air inlet 4 in a guided fashion. The collar 190 is moved, for example, manually using handle 192 or is machine operated using a step motor. Alternatively, the collar 190 is omitted, fixed in position, or replaced by an extension of the particulate and air inlet tubing 4 into the shroud 105. In one case, the distance between the collar 190 and the inside wall of the shroud 105 increases towards the top, as illustrated in FIG. 5c, but is not limited thereto.

Optionally, a screen or baffles are disposed in the extractor conduit 106 to prevent particles immersed in the flow of extracted air from being transmitted to the suction mechanism 6.

It is noted that the shroud 105 may be omitted, thus directly connecting the extractor conduit 106 to an opening disposed in an upper portion of the particulate and air inlet 4.

Figure 6:
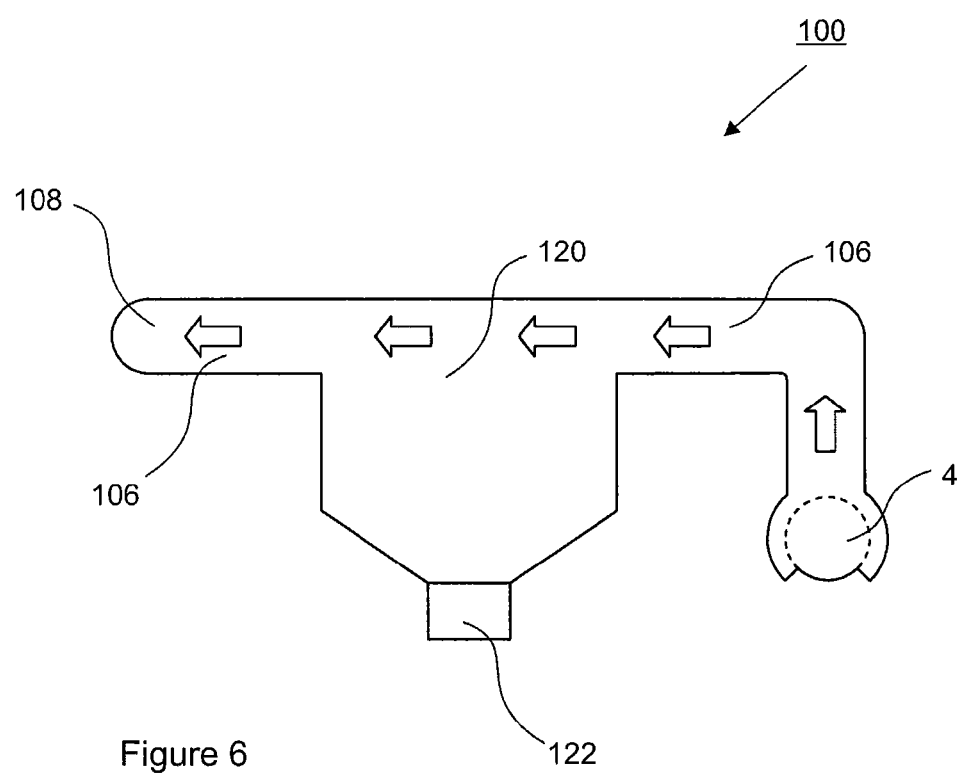
FIGS. 6 to 8 are simplified block diagrams illustrating a schematic view of various embodiments of the inlet air extractor comprising a mechanism for preventing the particulate and other particles immersed in the flow of particulate and air from being transmitted through the inlet air extractor.

In another embodiment illustrated in FIG. 6, a settling chamber 120 is interposed in the extractor conduit 106. The settling chamber 120 can be of conventional type and comprises a larger chamber having an inlet and an outlet connected to the extractor conduit 106. The sudden expansion of the size of the chamber reduces the speed of the air flow and heavier particles settle out and fall to the bottom of the settling chamber 120 where they can be removed through cleaning access 122.

Figure 7:
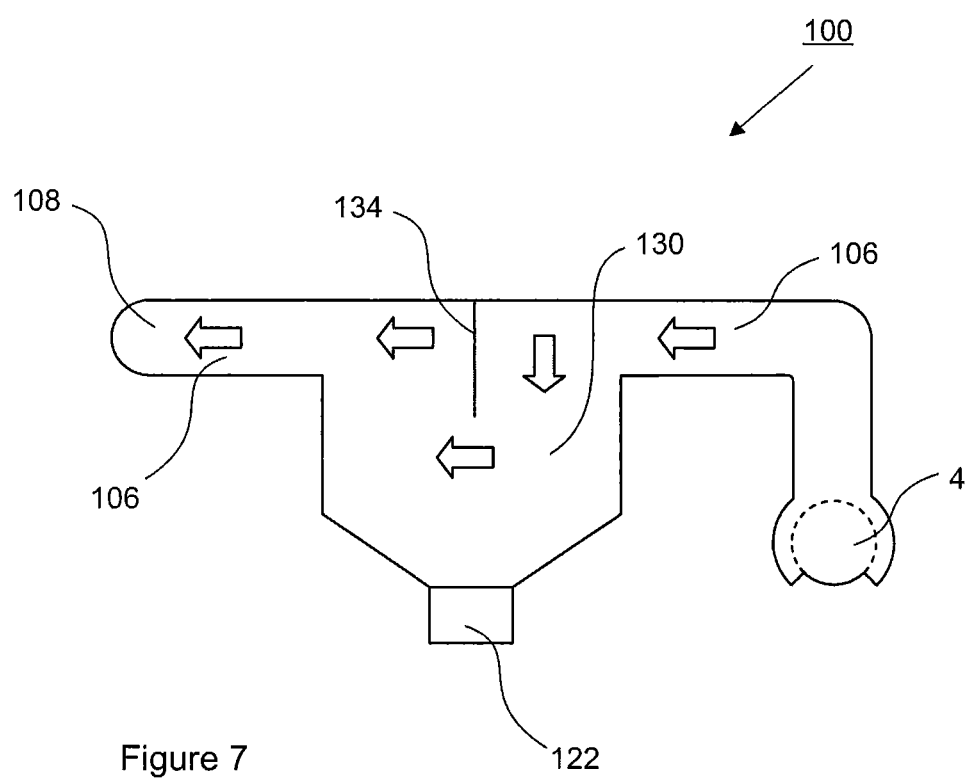

In another embodiment illustrated in FIG. 7, a baffle chamber 130 is interposed in the extractor conduit 106. The baffle chamber 130 can be of conventional type and of similar structure as the settling chamber 120 but comprises baffle 134 protruding from the top of the chamber downward a predetermined distance. The baffle 134 causes the air flow to make a sudden change of direction—as indicated by the small block arrows. Larger particles do not follow the air flow, but impinge onto the baffle 134 and fall to the bottom of the chamber or get directed towards the bottom of the baffle chamber 130 where they can be removed through cleaning access 122.

Figure 8:
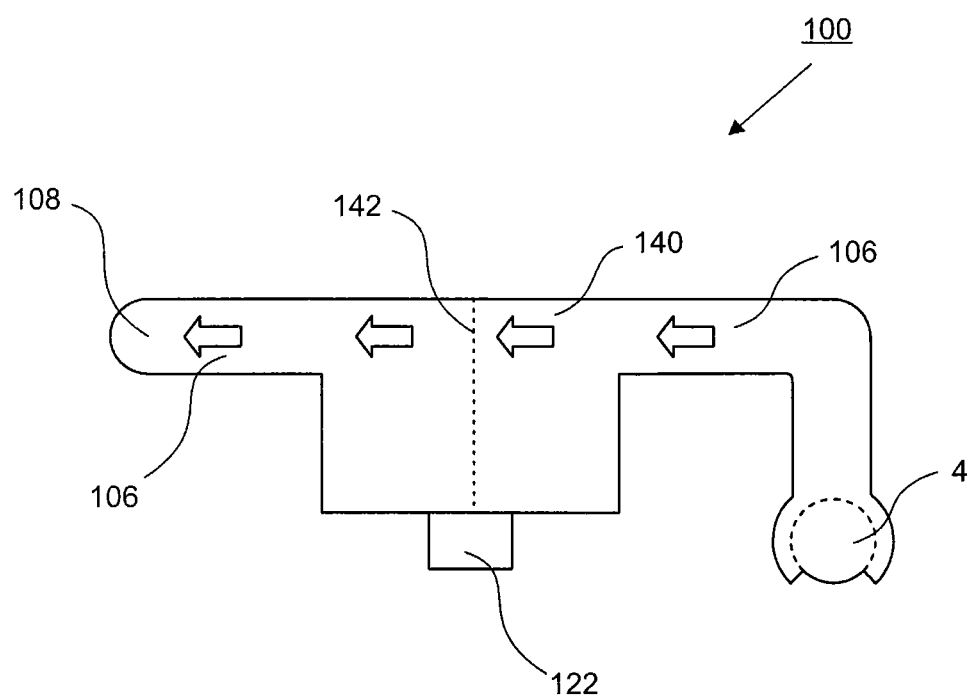

In another embodiment illustrated in FIG. 8, a filter chamber 140 is interposed in the extractor conduit 106. The filter chamber 140 can be of conventional type and comprises a chamber having disposed therein a filter element 142 such as, for example, a perforated plate made of a sheet material having a plurality of openings of predetermined size disposed thereon such that the flow of air is transmitted there through but the particulate and other particles are substantially blocked and settle at the bottom of the inlet side of the filter chamber 140 where they can be removed through cleaning access 122.

The inlet air extractor 100 may comprise a mechanism for adjusting the suction there through. For example, the operator of the particulate loader and transfer apparatus is enabled to adjust the through the inlet air extractor 100 in dependence upon at least one of a type of the particulate—small particulate, light particulate, large particulate, heavy particulate—and a condition of the particulate—dry, wet. Typically, a larger flow of air is required for transporting heavy and wet particulate (a) through the hose to the separation chamber 2 than for transporting light and dry particulate (b). Therefore, a larger portion of the air of the flow of air and particulate is extracted in case (a) than in case (b).

Figure 9:
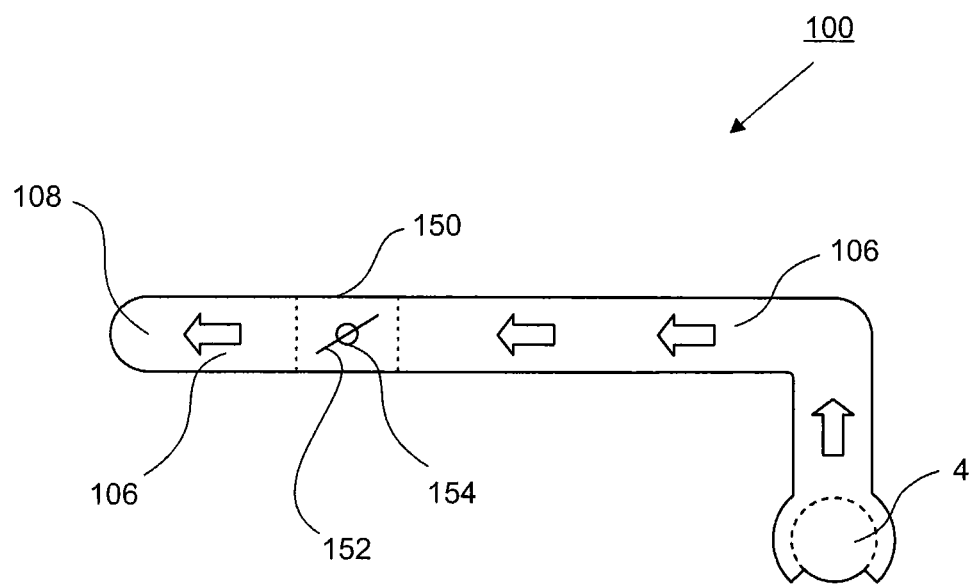
FIG. 9 is a simplified block diagram illustrating a schematic view of an embodiment of the inlet air extractor comprising a mechanism for adjusting the suction there through; and, FIG. 10 is a simplified block diagram illustrating a schematic view of another embodiment of the inlet air extractor having a separate suction mechanism.
Figure 10:
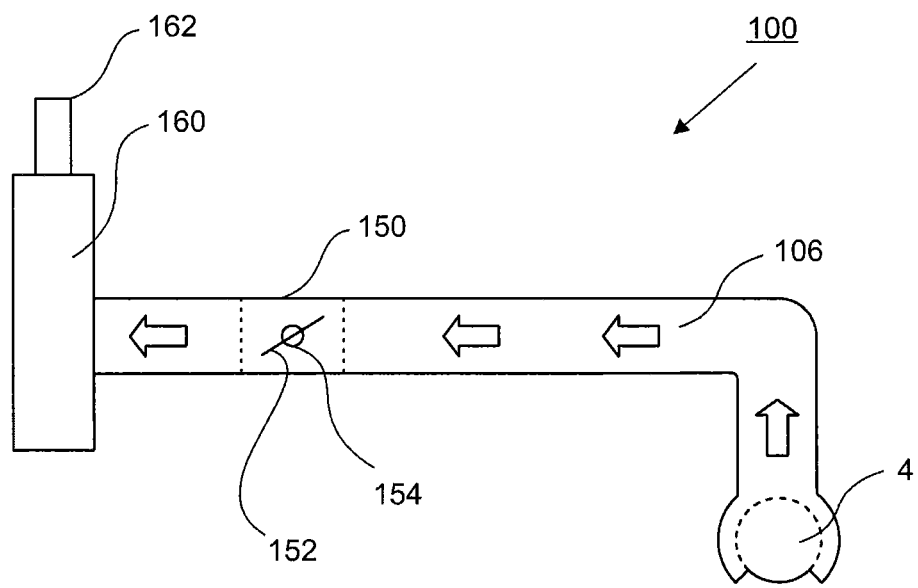

This is accomplished by moving the covers and/or collars in the embodiments described herein above. Alternatively, or additionally, an adjusting mechanism 150 is interposed in the extractor conduit 106 and comprises, for example, a flap 152 which is pivotally movable via pivot 154, as illustrated in FIG. 9. The flap 152 is adjusted using for example, a conventional mechanical mechanism for stepwise rotating the flap 152 by hand via a lever or using an electric step motor.

Optionally, the extractor 100 comprises a separate suction mechanism 160—independent from the suction mechanism 6—for providing suction to the extractor 100 and exhausting the air to atmosphere by way of exhaust outlet 162.

The extractor 100 can be made of a conventional sheet material such as, for example, steel or aluminum in a conventional manner and having a substantially circular cross section. Of course other materials and cross sectional shapes are also employable.

The size and shape of the inlet air extractor 100 is determined to be capable to extract a predetermined flow of air: in an empirical manner; using conventional engineering and design methods; or a combination thereof.

As is evident to one skilled in the art the various embodiments of the inlet air extractor 100 are implementable in existing designs of particulate loader and transfer apparatuses with minor modifications. Optionally, the inlet air extractor 100 is implemented as a retrofit into existing particulate loader and transfer apparatuses, for example, by providing a T-section for being interposed in a conduit between the suction mechanism 6 and the separation chamber 2; and an extractor section having the extractor conduit 106 mounted thereto, which is adapted for being interposed between an existing particulate and air inlet 4 and a vacuum pickup hose.

The present invention has been described herein with regard to certain embodiments. However, it will be obvious to persons skilled in the art that a number of variations and modifications can be made without departing from the scope of the invention as described herein.

What is claimed is:

1. A particulate loader separation device comprising:
   a particulate and air inlet for receiving a flow of air and particulate;
   a separation chamber connected to the particulate and air inlet, the separation chamber for separating the air and the particulate;
   an air outlet for being connected to a suction mechanism for providing suction to the separation chamber;
   a particulate outlet for being connected to a particulate conveyor for conveying the particulate from the separation chamber; and,
   an inlet air extractor connected to the particulate and air inlet and for being connected to one of the suction mechanism and a second suction mechanism, the inlet air extractor being connected to the particulate and air inlet at a predetermined location thereof such that in operation a portion of the air of the flow of air and particulate is extracted prior entering the separation chamber, wherein the inlet air extractor comprises an extractor conduit connected to an open section of the particulate and air inlet disposed in an upper portion thereof, wherein the inlet air extractor comprises a shroud connected to the extractor conduit, the shroud covering the open section of the particulate and air inlet, and wherein the open section comprises one of a wall having a plurality of openings and a screen.

2. A device as defined in claim 1 wherein the inlet air extractor comprises a movable cover for adjusting the size of the open section.

3. A device as defined in claim 2 wherein the cover is movable around a longitudinal axis of the particulate and air inlet.

4. A device as defined in claim 2 wherein the cover is movable along a longitudinal axis of the particulate and air inlet.

5. A device as defined in claim 1 wherein the shroud provides a transition from a smaller to a larger cross section of the particulate and air inlet.

6. A device as defined in claim 2 wherein the inlet air extractor comprises a collar, the collar being movable along a longitudinal axis of the particulate and air inlet.

7. A device as defined in claim 1 wherein the inlet air extractor comprises a deflecting collar, the deflecting collar being movable along a longitudinal axis of the particulate and air inlet.

8. A device as defined in claim 1 wherein a portion of the extractor conduit is oriented substantially parallel to the particulate and air inlet.

9. A device as defined in claim 1 comprising at least one of: a settling chamber; a baffle chamber; and a filter chamber interposed in the extractor conduit.

10. A device as defined in claim 1 wherein the inlet air extractor comprises an adjusting mechanism for adjusting the suction there through.

11. A method for extracting air from a flow of air and particulate comprising:
providing a particulate loader comprising:
a separation chamber;
a particulate and air inlet connected to the separation chamber for providing the flow of air and particulate to the separation chamber;
a suction mechanism connected to the separation chamber for providing suction to the separation chamber; and
a particulate conveyor connected to the separation chamber for conveying the particulate from the separation chamber;
providing an inlet air extractor connected to the particulate and air inlet, wherein the inlet air extractor comprises an extractor conduit connected to an open section of the particulate and air inlet disposed in an upper portion thereof, wherein the inlet air extractor comprises a shroud connected to the extractor conduit, the shroud covering the open section of the particulate and air inlet, and wherein the open section comprises one of a wall having a plurality of openings and a screen; and
during operation of the particulate loader providing suction to the inlet air extractor for extracting a portion of the air of the flow of air and particulate prior entering the separation chamber.

12. A method as defined in claim 11 comprising substantially preventing particles immersed in the flow of air and particulate from being transmitted through the extractor conduit.

13. A method as defined in claim 11 comprising adjusting the suction through the extractor.

14. A method as defined in claim 13 wherein the suction through the extractor is adjusted in dependence upon at least one of a type of the particulate and a condition of the particulate.

* * * * *

UNITED STATES PATENT AND TRADEMARK OFFICE
CERTIFICATE OF CORRECTION

| | | |
|---|---|---|
| PATENT NO. | : 8,673,063 B2 | Page 1 of 1 |
| APPLICATION NO. | : 13/204220 | |
| DATED | : March 18, 2014 | |
| INVENTOR(S) | : Paul J. Kerr | |

It is certified that error appears in the above-identified patent and that said Letters Patent is hereby corrected as shown below:

In the Claims

In Claim 6, at Column 9, Line 15 reads:

"a device as defined in claim 2 wherein the inlet air"

It should read:

-- a device as defined in claim 5 wherein the inlet air --

Signed and Sealed this
Twenty-fourth Day of June, 2014

Michelle K. Lee
*Deputy Director of the United States Patent and Trademark Office*